(12) United States Patent
Ziemer

(10) Patent No.: US 9,005,063 B2
(45) Date of Patent: Apr. 14, 2015

(54) HYBRID DRIVE TRAIN FOR A MOTOR VEHICLE

(71) Applicant: Peter Ziemer, Tettnang (DE)

(72) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 54 days.

(21) Appl. No.: 13/754,753

(22) Filed: Jan. 30, 2013

(65) Prior Publication Data
US 2013/0196807 A1 Aug. 1, 2013

(30) Foreign Application Priority Data
Jan. 31, 2012 (DE) .......................... 10 2012 201 365

(51) Int. Cl.
| | |
|---|---|
| *F16H 3/66* | (2006.01) |
| *B60K 6/20* | (2007.10) |
| *B60K 6/365* | (2007.10) |
| *B60K 6/445* | (2007.10) |
| *B60K 6/48* | (2007.10) |
| *B60K 6/547* | (2007.10) |
| *F16H 3/72* | (2006.01) |
| *F16H 37/06* | (2006.01) |

(52) U.S. Cl.
CPC .............. *F16H 37/065* (2013.01); *B60K 6/365* (2013.01); *B60K 6/445* (2013.01); *B60K 6/48* (2013.01); *B60K 6/547* (2013.01); *B60K 2006/4841* (2013.01); *F16H 3/725* (2013.01); *F16H 2200/0043* (2013.01); *F16H 2200/2007* (2013.01); *F16H 2200/2041* (2013.01); *F16H 2200/2064* (2013.01); *Y02T 10/6221* (2013.01); *Y02T 10/6239* (2013.01)

(58) Field of Classification Search
USPC ...................... 475/269, 275–792, 5
See application file for complete search history.

(56) References Cited

U.S. PATENT DOCUMENTS

| | | | |
|---|---|---|---|
| 7,220,202 B2 * | 5/2007 | Singh et al. .................. | 475/5 |
| 7,252,611 B2 * | 8/2007 | Raghavan et al. ............. | 475/5 |
| 8,597,146 B2 * | 12/2013 | Holmes et al. ................ | 475/5 |
| 2005/0079942 A1 * | 4/2005 | Bauknecht et al. ........... | 475/5 |
| 2006/0052199 A1 * | 3/2006 | Singh et al. .................. | 475/5 |
| 2006/0194665 A1 * | 8/2006 | Heitmann et al. ............. | 475/5 |

FOREIGN PATENT DOCUMENTS

| | | |
|---|---|---|
| DE | 11 2006 000 917 T5 | 3/2006 |
| DE | 11 2006 003 030 T5 | 9/2008 |
| DE | 10 2010 028 026 A1 | 10/2011 |

OTHER PUBLICATIONS

Search Report from corresponding German Application DE 10 2012 201 365.2 (German Language).

* cited by examiner

*Primary Examiner* — Roger Pang
(74) *Attorney, Agent, or Firm* — Brinks Gilson & Lione

(57) ABSTRACT

A hybrid drive train for a motor vehicle, comprising at least one internal combustion engine and at least one electric motor, which is functionally connected to the internal combustion engine, or can be functionally connected to said internal combustion engine, wherein a multi-speed transmission having two planetary gear sets, with at least one transmission input shaft and at least one transmission output shaft is provided, wherein the multi-speed transmission exhibits at least four shift elements, the selective actuation of which results in different transmission ratios between the at least one transmission input shaft and the transmission output shaft, such that at least three forward gears are realized.

17 Claims, 7 Drawing Sheets

| Gear | K1 | U1 | D1 | U2 | D2 | EM1, EM2 | Transmission | Gear Jump |
|------|----|----|----|----|----|----------|--------------|-----------|
| 1VM  | o  | o  |    |    |    | M/Rek    | 4.63         |           |
|      |    |    |    |    |    |          |              | 1.67      |
| 2VM  |    |    |    | o  |    | M/Rek    | 2.78         |           |
|      |    |    |    |    |    |          |              | 1.67      |
| 3VM  | o  |    | o  |    |    | M/Rek    | 1.67         |           |
|      |    |    |    |    |    |          |              | 1.67      |
| 4VM  |    |    |    |    | o  | M/Rek    | 1.00         |           |
|      |    |    |    |    |    |          |              | Transmission-ratio stored : 4.63 |
| 1EM  |    | o  |    |    |    | M/Rek    | 4.63         |           |
|      |    |    |    |    |    |          |              | 2.80      |
| 2EM  |    |    | o  |    |    | M/Rek    | 1.67         |           |
| Motor-start | o |  |    |    |    | EM1      |              |           |
|      |    |    |    |    |    | EM2      |              |           |

Fig. 3

| Gear | K1 | K2 | U1 | D1 | U2 | D2 | EM1, EM2 | Transmission | Gear Jump |
|---|---|---|---|---|---|---|---|---|---|
| 1VM | o | | o | | | | M/Rek | 4.63 | 1.67 |
| 2VM | | o | | | o | | M/Rek | 2.78 | 1.67 |
| 3VM | o | | | o | | | M/Rek | 1.67 | 1.67 |
| 4VM | | o | | | | o | M/Rek | 1.00 | Transmission-ratio stored : 4.63 |
| 1EM1 | | | o | | | | M/Rek | 4.63 | 1.67 |
| 2EM2 | | | | | o | | M/Rek | 2.78 | 1.67 |
| 3EM1 | | | | o | | | M/Rek | 1.67 | 1.67 |
| 4EM2 | | | | | | o | M/Rek | 1.00 | |
| Motor-start | o | | | | | | EM1 | | |
| | | o | | | | | EM2 | | |

Fig. 6

HYBRID DRIVE TRAIN FOR A MOTOR VEHICLE

PRIORITY STATEMENT

This application claims the benefit of Germany Patent Application DE 10 2012 201 365.2, filed Jan. 31, 2012, and incorporates the Germany Patent Application by reference herein in its entirety.

BACKGROUND

The invention relates to a transmission having at least one transmission input shaft and one transmission output shaft, having a first planetary gear set and a second planetary gear set, having two power paths between an input drive and the second planetary gear set, wherein the first power path exhibits a first fixed transmission ratio, wherein the second power path exhibits a second fixed transmission ratio, wherein the second fixed transmission ratio is lower that the first fixed transmission ratio, wherein either the first power path or the second power path comprises the first planetary gear set, wherein the second planetary gear set exhibits three shafts, designated in the rotational rate configuration as the fourth, fifth and sixth shafts.

Furthermore, the invention relates to a hybrid drive train for a motor vehicle comprising at least one internal combustion engine and at least one electric motor.

From the patent application DE 10 2010 028 026 by the applicant, a hybrid drive train having an internal combustion engine and numerous electric motors is known. With this hybrid drive train, a gear transmission having two sub-transmissions is used, each of which exhibits a shiftable gear step. The shiftable gear steps present in the sub-transmissions are, apart from a direct drive having coaxial input and output drives, each generated by means of exactly one individual transmission, such as a spur-gear pair or a planetary gear set. A four-speed countershaft transmission having a coaxial output drive would therefore require at least four individual transmissions in the form of four spur-gear pairs for the four speeds.

SUMMARY

One objective of the invention is to reduce the necessary construction expenditure for a hybrid drive train having a multi-speed transmission, in particular for smaller passenger cars having four speeds.

This objective shall be attained in accordance with the invention with a hybrid drive train having a transmission of the type specified in the introduction, in that the first power path comprises at least one electric motor that can be functionally connected to the transmission input shaft via at least one first shift element, wherein either the fourth shaft or the sixth shaft can be connected to the first power path via a second shift element, and to the second power path via a third shift element, wherein the fifth shaft can be connected to the first power path via a fourth shift element, and is permanently connected to the transmission output shaft.

The solution according to the invention is distinguished above all by a substantially reduced and simplified construction, by means of which an optimization with regard to the overall weight and the necessary installation space can also be obtained. Each pair of shift elements can be actuated alternately by means of a double-acting actuator. For this, an engagement of a first shift element causes a disengagement of a second shift element. All of the shift elements specified in this application can be designed as form-locking shift elements, for example as dog clutch shift elements, in particular dog clutch couplings or dog clutch brakes. Another advantage of the transmission according to the invention is that the shift element used requires no synchronization device, because a synchronization of the shift element can take place by means of the electric motor and an internal combustion engine in an unloaded state. Moreover, the electric motor can serve as a rotational speed sensor (resolver). By this means, undefined rotational rate states of the planetary gear sets at the input drive and output drive can be prevented, during and not during the shifting of the gears, by means of permanently defined rotational rates of the electric motor. Furthermore, a power shifting can take place via the electric motor while driving in the internal combustion mode.

The planetary gear sets used are designed as minus planetary gear sets. A simple minus planetary gear set comprises a sun gear, a ring gear, and a carrier, on which the planetary gears are rotationally supported, each of which engages with the sun gear and the ring gear. As a result, the ring gear exhibits a rotational direction opposite of that of the sun gear when the carrier is fixed in place. On the other hand, a simple plus planetary gear set comprises a sun gear, a ring gear and a carrier, on which inner and outer planetary gears are rotationally supported, wherein all inner planetary gears engage with the sun gear, and all outer planetary gears engage with the ring gear, wherein each inner planetary gear engages with one outer planetary gear, respectively. As a result, the ring gear has the same rotational direction as that of the sun gear when the carrier is fixed in place. According to the invention, a minus planetary gear set can, however, be replaced with a plus planetary gear set if, at the same time, the carrier and ring gear connection is reversed, and the value of the stationary gear ratio of the planetary gear set is increased by 1 in comparison with the design as a minus planetary gear set.

A four speed transmission can be created in a simple manner in that the transmission input shaft can be connected to the second power path by means of at least one fifth shift element.

One example embodiment of the invention, which functions with a lower number of necessary shift elements, provides that by means of a selective engagement of the shift element, at least three power shiftable forward gears can be implemented, wherein the first forward gear is obtained by engaging the first shift element and the second shift element, the second forward gear is obtained by engaging the third shift element, and the third forward gear is obtained by engaging the first shift element and the fourth shift element. According to an example embodiment of the invention, in which the transmission output shaft can be connected to the second power path by means of the fifth shift element, a fourth forward gear can be implemented by means of engaging the fifth shift element.

A particularly advantageous variation of the invention, in which a start, start up, reversing, boosting, recuperation and power shifting occurs via the electric motor, provides that the first planetary gear set exhibits three shafts, designated in the rotational rate configuration as the first, second and third shafts, and that the first shaft is dedicated to the first planetary gear set, wherein the electric motor is connected to the second shaft of the first planetary gear set, and the second shaft can be connected to the transmission input shaft via the first shift element, or that the electric motor is connected to the second shaft of the first planetary gear set, and the third shaft of the first planetary gear set is permanently connected to the transmission input shaft, wherein the first shaft of the first planetary gear set can be fixed in place by means of a brake, or that the first shaft of the first planetary gear set is fixed in place, and the electric motor is connected to the third shaft of the first planetary gear set and the third shaft of the first planetary gear set can be connected to the transmission input shaft via the first shift element. Another advantage can be seen in that a separate reverse gear is not necessary, and a purely electrical driving mode is possible.

Preferably, the transmission output shaft is disposed coaxially to the transmission input shaft, wherein the first planetary gear set is designed as an underdrive planetary gear set for providing a lower rotational rate than that of the transmission input shaft, wherein the underdrive planetary gear set is designed as a minus gear set, a sun gear of the first planetary gear set is fixed, or can be fixed in place via a brake, and the second shift element and the fourth shift element are connected to a carrier of the first planetary gear set, wherein a ring gear of the first planetary gear set is permanently connected to the transmission input shaft, or can be connected thereto via the first shift element, wherein the second power path is a direct input drive.

The aforementioned objective can also be attained according to the invention with a hybrid drive train of the type specified in the introduction, in that it exhibits a transmission according to one or more example embodiments of the present invention.

According to another example embodiment of the invention, at least one second electric motor in the form of a starter motor or starter generator can be provided, that is connected directly to the internal combustion engine, or connected by means of a transmission, or can be connected in a releasable manner via at least a sixth shift element. With this variation of the invention, there is the advantage that, through disengaging the sixth shift element, a purely electrical, power shiftable, driving mode is enabled in all gearings. Through the use of a starter motor there is the advantage that a start up of the internal combustion engine is also possible during a purely electrical driving mode, without interruption to the driving power. If a starter generator is used instead of a starter motor, there is the additional advantage that a system is obtained that is independent of the battery size, because an internal combustion engine-electric drive mode is possible in the odd numbered gears.

A particularly simple and space-saving construction is obtained in that in each case two shift elements can be actuated by means of a double-acting actuator, wherein the second shift element and the fourth shift element and/or the third shift element and the fifth shift element and/or the first shift element and the sixth shift element, respectively, can be actuated by means of a double-acting actuator.

BRIEF DESCRIPTION OF THE DRAWINGS

The invention, including other advantages, shall be explained in greater detail below based on a few non-limiting example embodiment examples, which are depicted in the drawings. They show, schematically:

FIG. 3 a shifting pattern for the hybrid drive train depicted in FIG. 1;

FIG. 6 a shifting patter for the hybrid drive train depicted in FIG. 4.

DETAILED DESCRIPTION OF EXAMPLE EMBODIMENTS

By way of introduction, it is maintained that in the differently described example embodiments, identical parts are provided with the same reference symbols, wherein the disclosures contained in the overall description the same reference symbols or same component symbols can be applied to identical parts.

Figure 1:
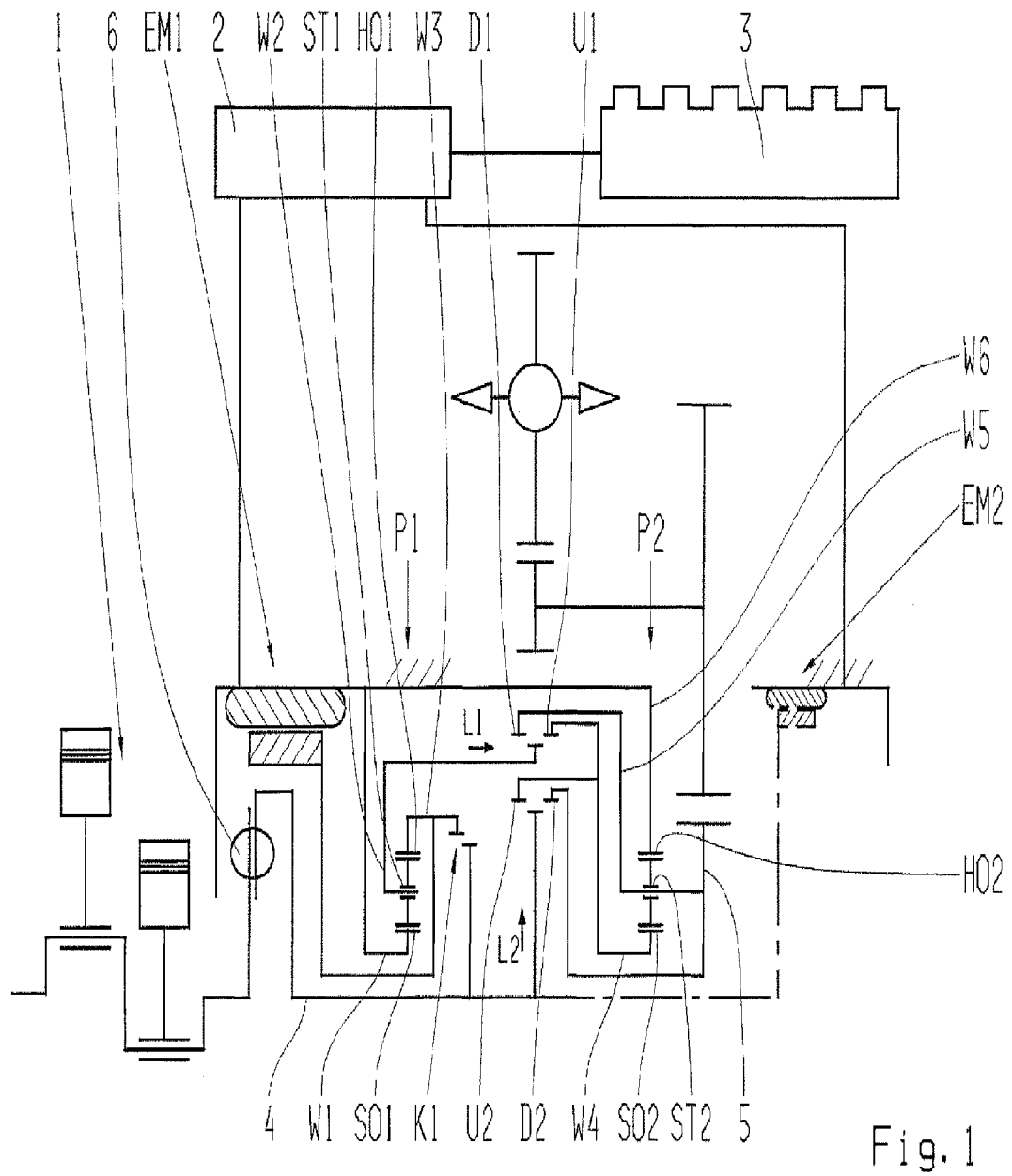
FIG. 1 a transmission pattern of a first example embodiment of a hybrid drive train according to the invention.

According to FIG. 1, a hybrid drive train according to the invention for a motor vehicle features an internal combustion engine 1 and at least one electric motor EM1. Furthermore, a control device 2 for the electric motor EM1 and an electric energy storage device 3 are provided.

The hybrid drive train exhibits a transmission according to the invention having a transmission input shaft 4 and a transmission output shaft 5. For vibration dampening, a torsional vibration damper 6 can be provided between the internal combustion engine 1 and the transmission. Furthermore, a second electric motor EM2, for example, in the form of a starter motor or a starter generator can be provided. The second electric motor EM2 can be permanently connected to the internal combustion engine 1, or connected in a releasable manner directly or via a transmission to the internal combustion engine 1.

An axle differential and/or a distributer differential can be disposed at the output end.

The transmission features two planetary gear sets P1, P2, having six shafts W1, W2, W3, W4, W5, W6 in the rotational rate configuration, i.e., according to their sequence in the rotational rate diagram, designated as the first, second, third, fourth, fifth, and sixth shafts. The shaft W1 is connected to the sun gear SO1, the shaft W2 is connected to the carrier ST1, the shaft W3 is connected to the ring gear HO1, the shaft W4 is connected to the sun gear SO2, the shaft W5 is connected to the carrier ST2, and the shaft W6 is connected to the ring gear HO2.

Furthermore, the transmission features two power paths L1, L2 between an input drive and the planetary gear assembly P2. The first power path L1 comprises, aside from the planetary gear assembly P1, the electric motor EM1. The first power path L1 exhibits a first fixed transmission ratio and the second power path L2 exhibits a second fixed transmission ratio, whereby the second transmission ratio is lower than the first transmission ratio.

The electric motor EM1 can be connected, as depicted in FIG. 1, to the third shaft W3. A shift element K1 is disposed thereby between the shaft W3 and the transmission input shaft 4. Alternatively to a permanent connection to the shaft W3, the electric motor EM1 can also be connected, however, in a releasable manner, directly or via a transmission, in particular a belt, chain, spur-gear, or planetary gear set, to the shaft W3.

In differing from the depiction in FIG. 1, the electric motor EM1 can also be connected to the second shaft W2. For this, the shaft W3 could be permanently connected to the transmission input shaft 4. In this case, either a brake between a housing of the transmission and the shaft W1 would need to be provided, or the shift element K1 would need to be connected to the second shaft W2.

The second shaft W2 can be connected by means of a shift element U1 to the fourth shaft W4, and by means of a shift element D1 to the fifth shaft W5. The fourth shaft W4 can be connected to the transmission input shaft 4 via a shift element U2, wherein the fifth shaft W5 is permanently connected to the transmission output shaft 5, and the sixth shaft W6 is fixed in place. At this point it is noted that in the present text, the terms "permanent," and "fixed" or "rotationally fixed" can be used as synonyms. The fifth shaft W5 can be connected to the transmission input shaft 4 via a shift element D2.

In an example embodiment, the transmission output shaft 5 may be disposed coaxially to the transmission input shaft 4, wherein the first planetary gear set P1 is designed as an underdrive planetary gear set for providing a lower rotational rate than that of the transmission input shaft 4. The underdrive planetary gear set P1 can be designed as a minus gear set, wherein the sun gear SO1 is fixed in place and the shift element U1 and the shift element D1 are connected to a carrier ST1. A ring gear HO1 of the first planetary gear set P1 can be connected to the transmission input shaft 4 via the shift element K1.

The planetary gear set P1, located in the vicinity of the input drive, can, however, be designed as an overdrive gear set. For this, an input torque would need to be applied to the carrier ST1 by the ring gear HO1 in the first planetary gear set P1 depicted in FIG. 1, the output to the shift elements U1 and D3 would need to be left on the carrier ST1, the connections of the shift elements U2 and D2 to the transmission input shaft 4 would need to be released, and instead of this, the shift elements would need to be provided at the input end on the ring gear HO1 of the first planetary gear set P1.

Four power shiftable forward gears can be implemented through selective, paired engagement of the shift elements K1, U2, U1, D1, D2 of the transmission. A three speed transmission can be implemented by means of eliminating the shift element D2.

Figure 2:
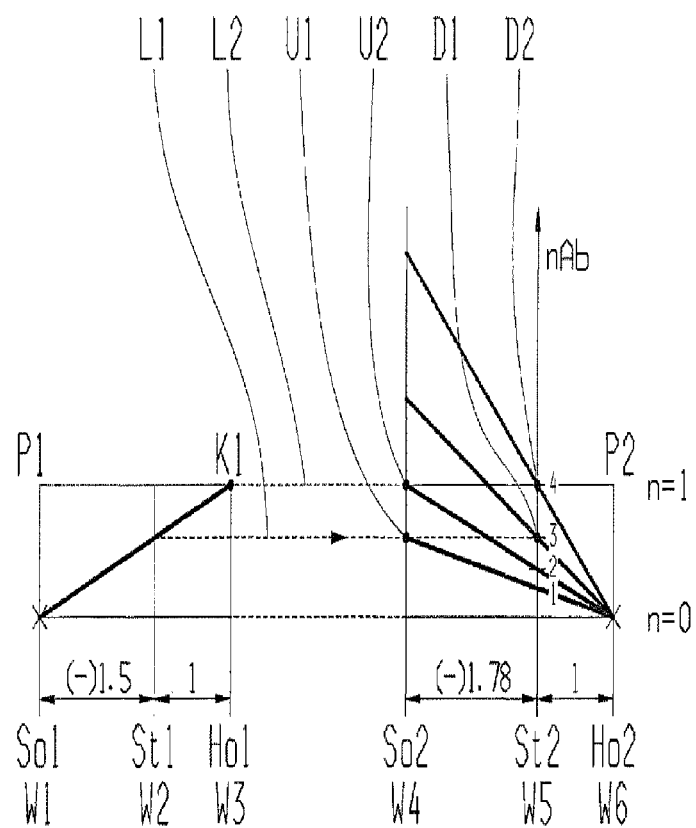
FIG. 2 a rotational rate diagram of the hybrid drive train from FIG. 1.

The relationships between the gears obtained through selective engagement of the shift elements Kl, U2, U1, D1, D2 and the transmission ratios of each shaft W1, W2, W3, W4, W5, W6 can be seen from the rotational rate diagram or rotational rate design depicted in FIG. 2. The rotational rate ratios are entered vertically on the individual shafts W1, W2, W3, W4, W5, W6. The horizontal spacing between the shafts is the result of stationary transmission ratios, such that the rotational rate ratios associated with a specific operating point can be connected by a straight line. With a specific input rotational rate, the operating curves of the second planetary gear set P2 characterize the rotational rate ratios in the three or four forward gears, respectively, wherein the fourth forward gear is a direct drive gear. The input rotational rate is standardized to 1.

As is depicted in FIG. 2, the fourth shaft W4 can be connected to the first power path L1 via a second shift element U1, and to the second power path L2 via a third shift element U2. The fifth shaft W5 can be connected to the first power path L1 via a fourth shift element D1, and to the second power path L2 via a fifth shift element D2, and is permanently connected to the transmission output shaft 5. The shaft W6 is fixed in place in the depicted example embodiment. Alternatively, it would also be possible to fix the fourth shaft and to provide the shift elements U1 and U2 on the shaft W6, wherein the stationary transmission ratio of the planetary transmission P2 would need to be adjusted accordingly.

An exemplary shifting pattern for the transmission depicted in FIG. 1 is to be derived from FIG. 3. The respective transmission ratios of the individual gear steps and the gear transitions to the next higher gear to be determined therefrom can be derived from the shifting pattern in an exemplary manner, wherein the transmission exhibits a spread of 4.63. Typical values for the stationary transmission ratios of the planetary gear sets P1, P2 designed in the present case as minus planetary gear sets, are −1.5 for P1, and −1.78 for P2.

The first forward gear is obtained through engaging the shift element K1 and the shift element U1, the second forward gear is obtained through engaging the shift element U2, the third forward gear is obtained through engaging the shift element K1 and the shift element D1, and a fourth forward gear is obtained through engaging the shift element D2.

Figure 4:
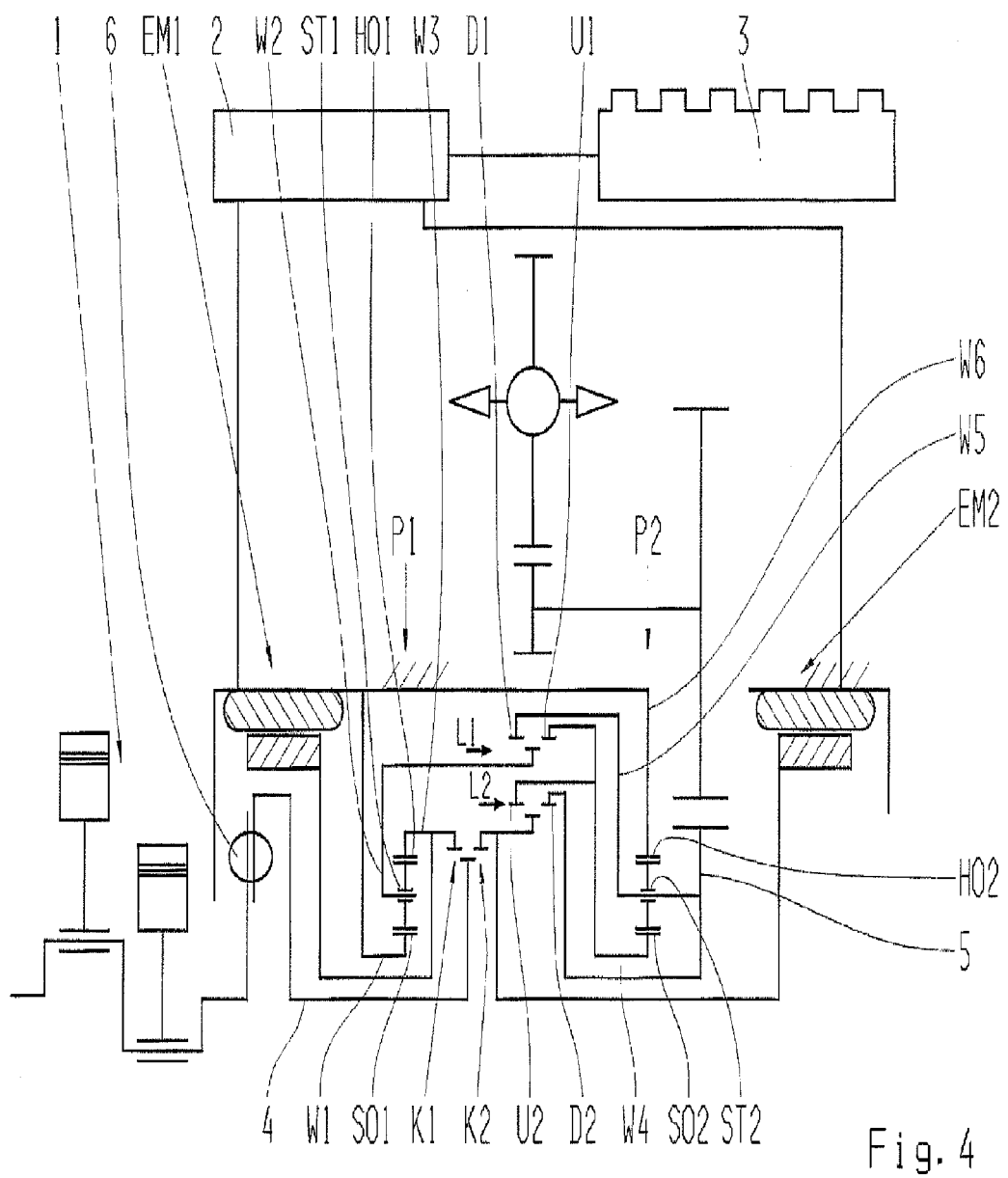
FIG. 4 a transmission pattern of a second example embodiment of a hybrid drive train according to the invention.

As can be derived from FIG. 4, the second electric motor EM2 can be connected, in the form of a starter motor or starter generator, to the internal combustion engine 1 via a shift element K2. Alternatively, the second electric motor EM2, as depicted in FIG. 1, can be permanently connected to the internal combustion engine 1.

Figure 5:
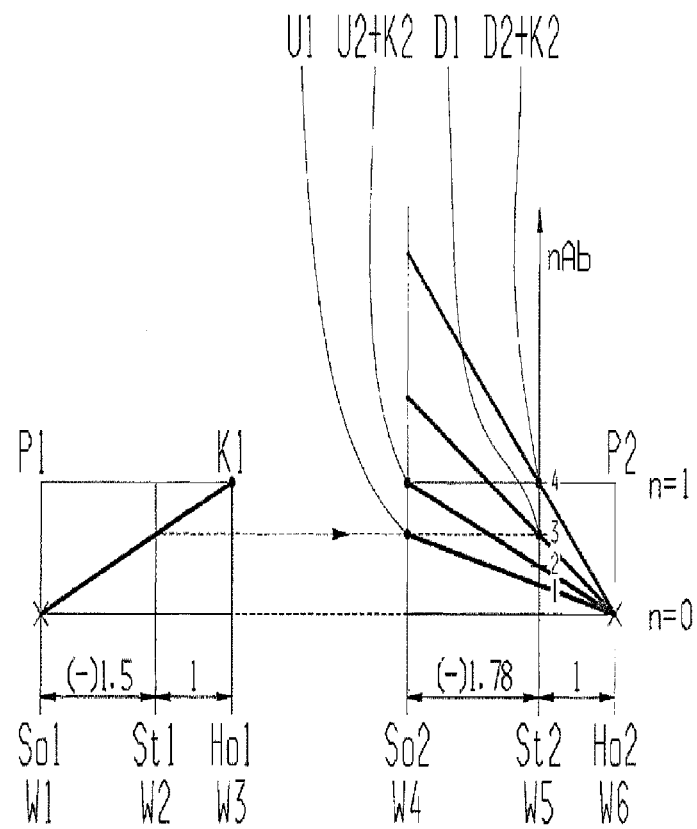
FIG. 5 a rotational rate diagram of the hybrid drive train from FIG. 4.

A rotational rate design for the transmission depicted in FIG. 4 can be derived from FIG. 5.

The fourth shaft W4 can be connected by the shift element U1 to the first power path L1, and to the second power path L2 through engaging the shift elements U2 and K2, while the fifth shaft W5 can be connected to the first power path L1 via the shift element D1, and to the second power path L2 via the shift elements D2 and K2. The shaft W6 is fixed in place in the depicted example embodiment. Alternatively, it would also be possible to fix the shaft W4, and to provide the shift elements U1, U2 and K2 on the shaft W6, wherein, in this case, the stationary transmission ratio of the planetary gear sets P1 and P2 would need to be adjusted accordingly.

At this point it is emphasized that in the depicted example embodiments, the planetary gear set P1 is designed as an underdrive planetary gear set, wherein the second power path L2 is a direct input drive. With an example embodiment of the planetary gear set P1 as an overdrive planetary gear set, the first power path, however, would be a direct input drive. In the case of the depicted underdrive planetary gear set, the highest gear represents a direct drive gear, while in the case of an overdrive planetary gear set P1, the direct drive gear would be the second highest gear.

As can be derived from the shifting pattern in FIG. 6, in the hybrid drive train depicted in FIG. 4, an internal combustion engine drive mode is obtained with an engaged shift element K1 or K2. The power shifting takes place thereby via the electric gears as support gears. With disengaged shift elements K1 and K2, a purely electrical drive mode is obtained in all gears, which can also be shifted in a power shift manner. From the shifting pattern, the respective transmission ratios of the individual gear steps and the resulting gear transitions to the next higher gear can be derived in an exemplary manner, wherein the transmission exhibits a spread of 4.63.

At this point it is also emphasized that with all described example embodiments of the invention, the shift elements U1, U2, D1, D2, and the shift elements K1 and K2 are designed as dog clutches.

With all of the example embodiments of the invention, the shift elements U1 and U2 as well as the shift elements U2 and D2, as well as the shift elements K1 and K2, can also be actuated, in each case, by a double-acting actuator. Thus, in each case a pair of shift elements can be actuated by a single actuator. By this means, the construction is simplified, and the necessary structural space and production costs can be reduced.

An activation of the internal combustion engine 1 is possible using the second electric motor EM2, even during the purely electrical driving mode, without interruption to the driving power. To start the internal combustion engine 1 during a purely electrical driving mode, the shift element K1 or K2 can be engaged after prior synchronization. Subsequently, it is possible to continue driving in all four gears in an internal combustion engine mode.

As is also visible from FIG. 6, a purely electrical driving in all four gears is likewise possible with disengaged shift elements K1 and K2 (forwards as well as driving in reverse).

It is also possible to integrate a parking brake in a simple manner in the hybrid drive train according to the invention. For this, for example, the first gear (K1 and U1 engaged) can be applied for parking. The parking brake can be released by generating a torque acting against a slope force by the electric motor EM1, and disengaging and unloading the shift element K1 in order to then be able to start up electrically.

Figure 7:
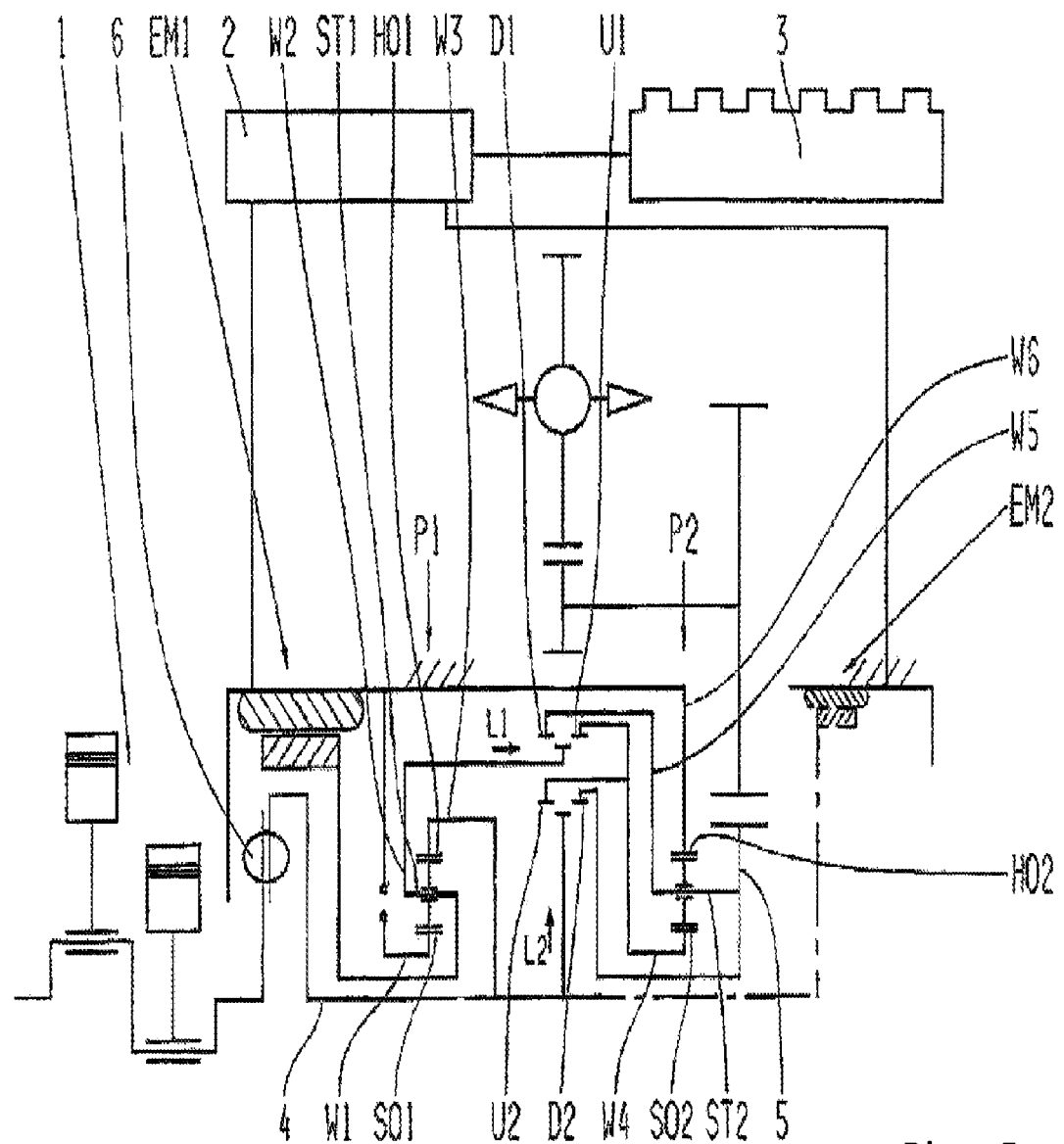
FIG. 7 a transmission pattern of a third example embodiment of a hybrid drive train according to the invention.

As can be derived from FIG. 7, shaft W1 is capable of being fixed in place by a brake. The shaft W2 can be connected to the electric motor EM1. The shaft W3 can be connected to the input shaft.

The embodiment examples show possible variations of the transmission according to the invention, or the hybrid drive train, respectively, wherein at this point it is noted that the invention is not limited to the specific depicted example embodiment variations. Furthermore, diverse combinations of the individual example embodiment variations are possible, wherein said variation possibilities, due to the teachings regarding the technical aspects of the present invention, may lay within the abilities of the person skilled in the art active in this technical field.

REFERENCE SYMBOLS 1 internal combustion engine
2 control device
3 electric energy storage device
4 transmission input shaft
5 transmission output shaft
6 torsional vibration damper
EM1 first electric motor
EM2 second electric motor
L1 first power path
L2 second power path
P1 first planetary gear set
P2 second planetary gear set
SO1 sun gear of the first planetary gear set
ST1 carrier of the firs planetary gear set
HO1 ring gear of the first planetary gear set
HO2 ring gear of the second planetary gear set
SO2 sun gear of the second planetary gear set
ST2 carrier of the second planetary gear set
K1 first shift element
U1 second shift element
U2 third shift element
D1 fourth shift element
D2 fifth shift element
K2 sixth shift element
W1 first shaft
W2 second shaft
W3 third shaft
W4 fourth shaft
W5 fifth shaft
W6 sixth shaft

The invention claimed is:

1. A transmission comprising:
an input shaft;
an output shaft;
a first planetary gear set;
a second planetary gear set;
a first power path between an input drive and the second planetary gear set, comprising a first fixed transmission ratio; and
a second power path between the input drive and the second planetary gear set, comprising a second fixed transmission ratio lower than the first fixed transmission ratio,
wherein either the first power path or the second power path comprises the first planetary gear set,
wherein the second planetary gear set comprises a fourth shaft, a fifth shaft, and a sixth shaft,
wherein the first power path comprises an electric motor connectable to the input shaft via a first shift element,
wherein either the fourth shaft or the sixth shaft is connectable to the first power path via a second shift element and to the second power path via a third shift element,
wherein the fifth shaft is connectable to the first power path via a fourth shift element and is permanently connected to the output shaft, and
wherein rotational speeds of the fourth shaft, fifth shaft, and sixth shaft vary linearly with each other in an increasing or decreasing rotational speed order of the fourth shaft, fifth shaft, and sixth shaft.

2. The transmission according to claim 1, wherein the output shaft is connectable to the second power path via a fifth shift element.

3. The transmission according to claim 1, wherein
a first forward gear is obtained through engaging the first shift element and the second shift element,
a second forward gear is obtained through engaging the third shift element,
a third forward gear is obtained through engaging the first shift element and the fourth shift element, and
a fourth forward gear is obtained through engaging a fifth shift element.

4. The transmission according to claim 1, wherein the first planetary gear set comprises:
a first shaft;
a second shaft; and
a third shaft, wherein rotational speeds of the first shaft, second shaft, and third shaft vary linearly with each other in an increasing or decreasing rotational speed order of the first shaft, second shaft, and third shaft,
wherein:
the first shaft is fixed in place,
the third shaft is connected to the electric motor; and
the third shaft is connectable to the input shaft by the first shift element.

5. The transmission according to claim 1, wherein the first planetary gear set comprises:
a first shaft;
a second shaft; and
a third shaft, wherein rotational speeds of the first shaft, second shaft, and third shaft vary linearly with each other in an increasing or decreasing rotational speed order of the first shaft, second shaft, and third shaft,
wherein:
the first shaft is capable of being fixed in place by a brake;
the second shaft is connected to the electric motor; and
the third shaft is connected to the input shaft.

6. The transmission according to claim 4, wherein the output shaft is disposed coaxially to the input shaft,
wherein the first planetary gear set is an underdrive planetary gear set for providing a lower rotational speed than that of the input shaft, wherein the underdrive planetary gear set is a minus planetary gear set, wherein:
the first shaft comprises the sun gear of the first planetary gear set, which is fixed in place;

the second shaft comprises the carrier of the first planetary gear set, which is connected to the second shift element and the fourth shift element; and the third shaft comprises the ring gear of the first planetary gear set, which is connectable to the input shaft via the first shift element, and wherein the second power path is a direct input drive.

7. The transmission according to claim 5, wherein the output shaft is disposed coaxially to the input shaft, wherein the first planetary gear set is an underdrive planetary gear set for providing a lower rotational speed than that of the input shaft, wherein the underdrive planetary gear set is a minus planetary gear set, wherein the first shaft comprises the sun gear of the first planetary gear set, which is configured to engage with a brake;

the second shaft comprises the carrier of the first planetary gear set, which is connected to the electric motor; and the third shaft comprises the ring gear of the first planetary gear set, which is connected to the input shaft, and wherein the second power path is a direct input drive.

8. The transmission according to claim 1, wherein the input shaft is a transmission input shaft and the output shaft is a transmission output shaft.

9. A hybrid drive train for a motor vehicle, comprising:
an internal combustion engine;
an electric motor; and
a transmission, comprising:
an input shaft;
an output shaft;
a first planetary gear set;
a second planetary gear set;
a first power path between an input drive and the second planetary gear set, comprising a first fixed transmission ratio; and
a second power path between the input drive and the second planetary gear set, comprising a second fixed transmission ratio,
wherein either the first power path or the second power path comprises the first planetary gear set,
wherein the second planetary gear set comprises a fourth shaft, a fifth shaft, and a sixth shaft,
wherein the first power path comprises an electric motor connectable to the input shaft via a first shift element,
wherein either the fourth shaft or the sixth shaft is connectable to the first power path via a second shift element and wherein either the fourth shaft or the sixth shaft is connectable to the second power path via a third shift element,
wherein the fifth shaft is connectable to the first power path via a fourth shift element and is permanently connected to the output shaft, and
wherein rotational speeds of the fourth shaft, fifth shaft, and sixth shaft vary linearly with each other in an increasing or decreasing rotational speed order of the fourth shaft, fifth shaft, and sixth shaft.

10. The hybrid drive train according to claim 9, further comprising a second electric motor capable of being connected to the internal combustion engine through direct connection, through a transmission in a releasable manner, or through a sixth shift element in a releasable manner.

11. The hybrid drive train according to claim 10, wherein two of the first, second, third, fourth, fifth, and sixth shift elements are capable of being actuated by a double-acting actuator.

12. The hybrid drive train according to claim 11, wherein the two shift elements are respectively one of:
the second shift element and the fourth shift element,
the third shift element and the fifth shift element, and
the first shift element and the sixth shift element.

13. The transmission according to claim 9, wherein the output shaft is connectable to the second power path via a fifth shift element.

14. The transmission according to claim 9, wherein
a first forward gear is obtained through engaging the first shift element and the second shift element,
a second forward gear is obtained through engaging the third shift element,
a third forward gear is obtained through engaging the first shift element and the fourth shift element, and
a fourth forward gear is obtained through engaging a fifth shift element when the fifth shift element is provided.

15. The hybrid drive train according to claim 9, wherein the first planetary gear set comprises:
a first shaft;
a second shaft; and
a third shaft,
wherein rotational speeds of the first shaft, second shaft, and third shaft vary linearly with each other in an increasing or decreasing rotational speed order of the first shaft, second shaft, and third shaft,
wherein:
the first shaft is fixed in place,
the third shaft is connected to the electric motor, and
the third shaft is capable of being connected to the input shaft by the first shift element.

16. The hybrid drive train according to claim 9, wherein the first planetary gear set comprises:
a first shaft;
a second shaft; and
a third shaft,
wherein rotational speeds of the first shaft, second shaft, and third shaft vary linearly with each other in an increasing or decreasing rotational speed order of the first shaft, second shaft, and third shaft,
wherein:
the first shaft being fixable by a brake,
the second shaft being connected to the electric motor, and
the third shaft being connected to the input shaft.

17. The hybrid drive train according to claim 15, wherein the output shaft is disposed coaxially to the input shaft,
wherein the first planetary gear set is an underdrive planetary gear set for providing a lower rotational rate than that of the input shaft, wherein the underdrive planetary gear set is a minus planetary gear set, wherein:
the first shaft comprises the sun gear of the first planetary gear set, which is fixed in place;
the second shaft comprises the carrier of the first planetary gear set, which is connected to the second shift element and the fourth shift element; and
the third shaft comprises the ring gear of the first planetary gear set, which is connectable to the input shaft via the first shift element, and
wherein the second power path is a direct input drive.

* * * * *